(12) United States Patent
Kageyama et al.

(10) Patent No.: US 9,132,862 B2
(45) Date of Patent: Sep. 15, 2015

(54) FRONT BODY STRUCTURE OF VEHICLE

(75) Inventors: Kazuhiro Kageyama, Hiroshima (JP);
Nobuyuki Nakayama, Aki-gun (JP);
Kuniyoshi Tashiro, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 3 days.

(21) Appl. No.: 14/119,136

(22) PCT Filed: May 18, 2012

(86) PCT No.: PCT/JP2012/003261
§ 371 (c)(1),
(2), (4) Date: Nov. 20, 2013

(87) PCT Pub. No.: WO2012/160793
PCT Pub. Date: Nov. 29, 2012

(65) Prior Publication Data
US 2014/0084632 A1    Mar. 27, 2014

(30) Foreign Application Priority Data
May 23, 2011    (JP) .................................. 2011-114352

(51) Int. Cl.
| | | |
|---|---|---|
| B62D 25/10 | (2006.01) |
| E05B 17/20 | (2006.01) |
| E05B 79/20 | (2014.01) |
| E05B 83/24 | (2014.01) |
| B62D 25/08 | (2006.01) |

(52) U.S. Cl.
CPC .......... *B62D 25/105* (2013.01); *E05B 17/2003* (2013.01); *E05B 79/20* (2013.01); *E05B 83/24* (2013.01); *B62D 25/084* (2013.01)

(58) Field of Classification Search
CPC   B62D 25/105; B62D 25/084; E05B 17/2003; E05B 79/20; E05B 83/24
USPC .............................. 296/193.09, 193.1, 193.11
See application file for complete search history.

(56) References Cited

U.S. PATENT DOCUMENTS

| | | | | |
|---|---|---|---|---|
| 3,820,361 A | * | 6/1974 | Leitner | ........................... 70/241 |
| 7,163,256 B2 | * | 1/2007 | Haunstetter | ................ 296/146.4 |
| 2008/0105795 A1 | * | 5/2008 | Archer et al. | ................... 248/65 |

FOREIGN PATENT DOCUMENTS

| | | |
|---|---|---|
| EP | 1783308 A2 | 5/2007 |
| JP | 08-150958 A | 6/1996 |

(Continued)

OTHER PUBLICATIONS

International Search Report; PCT/JP2012/003261; Aug. 14, 2012.

*Primary Examiner* — Glenn Dayoan
*Assistant Examiner* — Melissa A Black
(74) *Attorney, Agent, or Firm* — Studebaker & Brackett PC

(57) ABSTRACT

A vehicle front body structure comprises: a hood for covering a top of an engine compartment provided in a front section of a vehicle; an engagement element provided at a front section of the hood; a radiator shroud provided at a front section of the engine compartment; an engagement counterpart element provided in front of the radiator shroud and engageable with the engagement element; a wire arranged to extend from a lateral side of the radiator shroud and pass through a position in front of the radiator shroud, and coupled to the engagement counterpart element; and a support supporting the engagement counterpart element with respect to the radiator shroud. The support has a protruding portion which protrudes toward a position capable of hindering at least a part of the wire from being visually seen from a front side of the vehicle body.

6 Claims, 9 Drawing Sheets

(56) References Cited

FOREIGN PATENT DOCUMENTS

| | | |
|---|---|---|
| JP | 2000-177645 A | 6/2000 |
| JP | 2002-079906 A | 3/2002 |
| JP | 2003-063445 A | 3/2003 |
| JP | 2007-118793 A | 5/2007 |
| JP | 2007-137097 A | 6/2007 |

\* cited by examiner

FRONT BODY STRUCTURE OF VEHICLE

TECHNICAL FIELD

The present invention relates to a vehicle front body structure, and more particularly to a vehicle front body structure which comprises a hood (bonnet) for covering a top of an engine compartment provided in a front section of a vehicle, an engagement element provided on a front section of the hood, and a radiator shroud provided in a front section of the engine compartment.

BACKGROUND ART

Heretofore, there has been known a vehicle front body structure in which a radiator shroud is provided in a front section of a vehicle body of a vehicle, wherein a housing member which houses a latch for locking a striker of a hood is fixed to a vehicle-widthwise (vehicle-width-directionally) intermediate portion of the radiator shroud, by welding or the like, and a coupling member is provided to couple the housing member and a vehicle-widthwise intermediate portion of a bumper reinforcement, as described in the following Patent Document 1. Here, the housing member is formed in a box shape opened upwardly, and the coupling member is formed with an attaching flange at an upper end thereof, wherein the attaching flange is formed in an approximately quadrangular shape approximately coincident with a shape of a front surface of the housing member, and vehicle-widthwise right and left ends of the attaching flange are fixedly bolted to the housing member.

Generally, in this type of vehicle, a hood release wire is connected to the latch. For example, the latch is configured to be opened and closed according to a displacement of the hood release wire, thereby causing the hood to be opened and closed. Specifically, the hood release wire is arranged to extend from a vehicle rear end side of the radiator shroud to a position in front of the radiator shroud while penetrating through the radiator shroud, and connected to the latch provided in front of the radiator shroud.

On the other hand, when a wire such as a hood release wire is arranged to extend from a lateral side of the radiator shroud and along a front surface of the radiator shroud, it becomes unnecessary to provide a wire-penetration through-hole in the radiator shroud, so that it becomes possible to enhance rigidity of the radiator shroud. However, if the wire is arranged in this manner, it becomes possible to perform a manipulation, for example, of inserting a hooking member composed of a hook-equipped bar or the like from an air inlet opening of a grill provided in front of the vehicle body, to hook the wire and open the latch. If such a manipulation is enabled, a theft such as an act of opening a hood to steal a vehicle, vehicle components, etc., is likely to be carried out.

LIST OF PRIOR ART DOCUMENTS

Patent Documents

Patent Document 1: JP 2003-63445A

SUMMARY OF THE INVENTION

The present invention has been made to solve the above problem in the conventional technique, and an object thereof is to provide a vehicle front body structure capable of suppressing a risk that a wire coupled to an engagement counterpart element (latch) is improperly manipulated from a position in front of a vehicle body.

In order to achieve the above object, the present invention provides a vehicle front body structure which comprises: a hood for covering a top of an engine compartment provided in a front section of a vehicle; an engagement element provided on a front section of the hood; a radiator shroud provided in a front section of the engine compartment; an engagement counterpart element provided in front of the radiator shroud and engageable with the engagement element; a wire arranged to extend from a lateral side of the radiator shroud and pass through a position in front of the radiator shroud, and coupled to the engagement counterpart element; and a support supporting the engagement counterpart element with respect to the radiator shroud. The support has a protruding portion which protrudes toward a position capable of hindering at least a part of the wire from being visually seen from a front side of the vehicle body.

DESCRIPTION OF EMBODIMENTS

Figure 1:
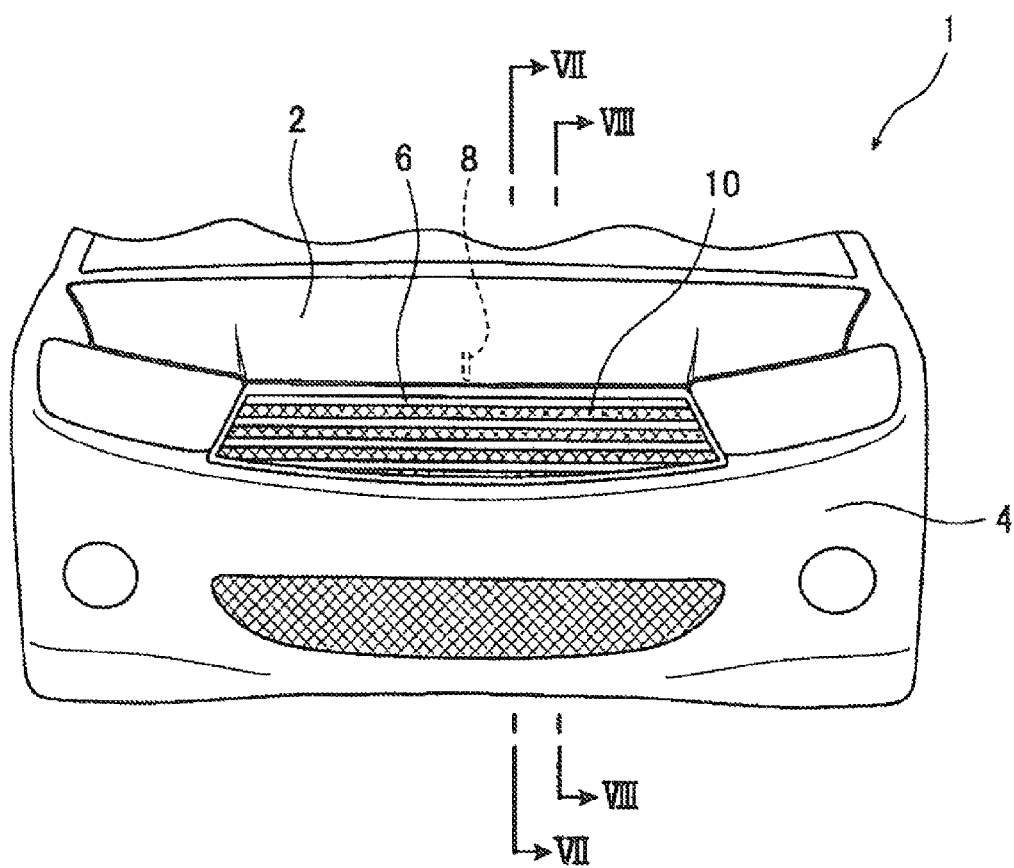
FIG. 1 is a front view illustrating a structure, primarily an exterior structure, of a front section of a vehicle body (vehicle front body), according to a first embodiment of the present invention.
Figure 2:
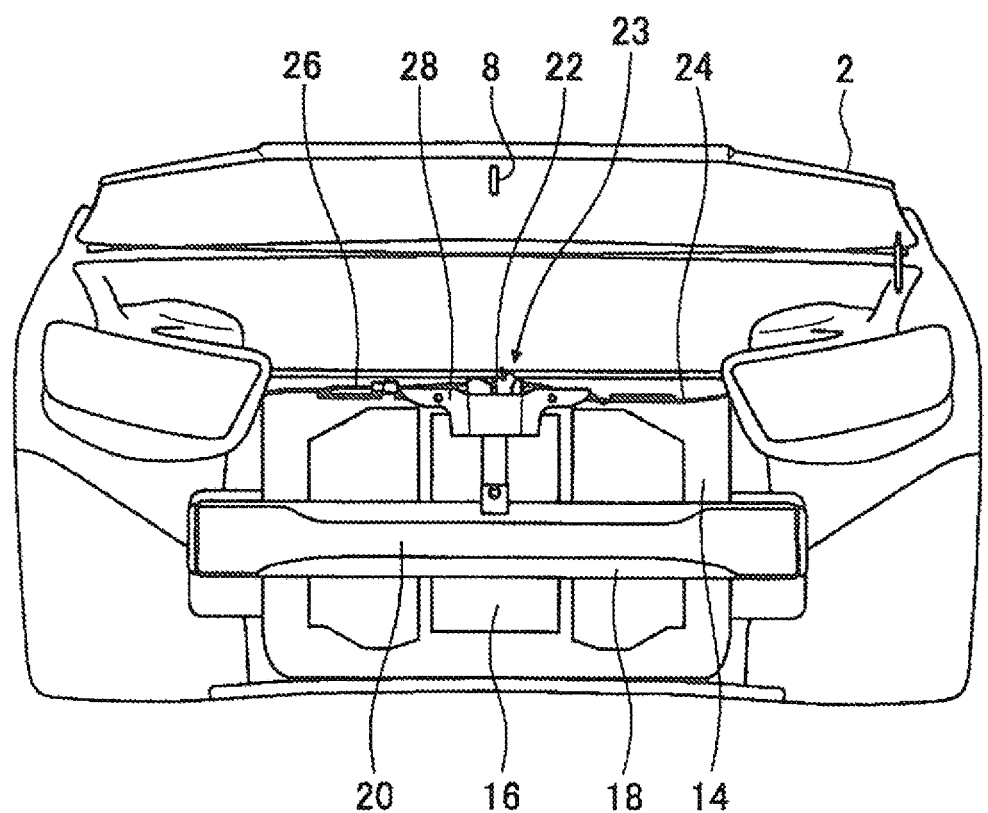
FIG. 2 is a schematic front view illustrating a structure, primarily an internal structure, of the vehicle front body, according to the first embodiment of the present invention.
Figure 3:
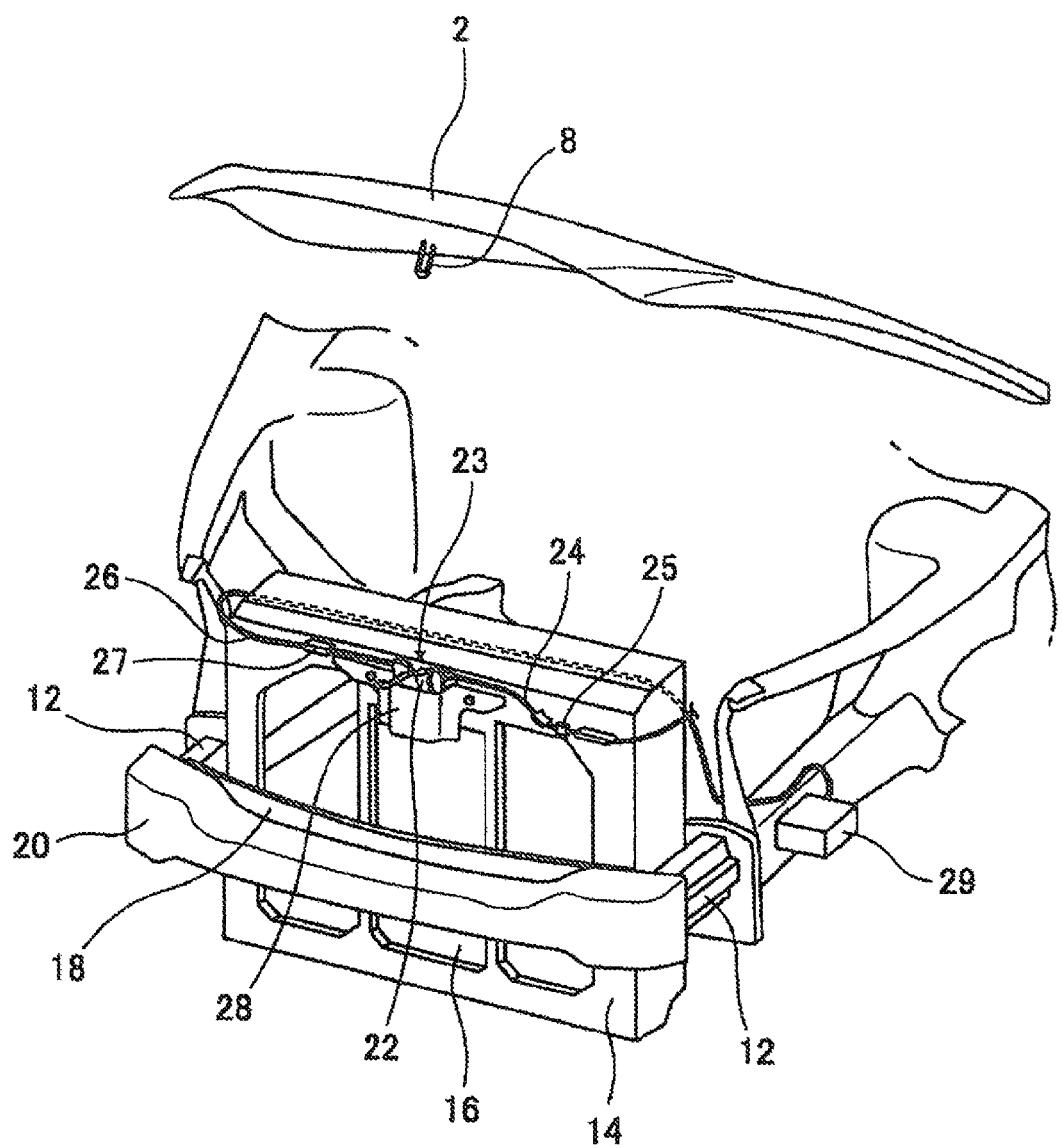
FIG. 3 is a perspective view illustrating, in a simplified manner, the internal structure of the vehicle front body, according to the first embodiment of the present invention.
Figure 4:
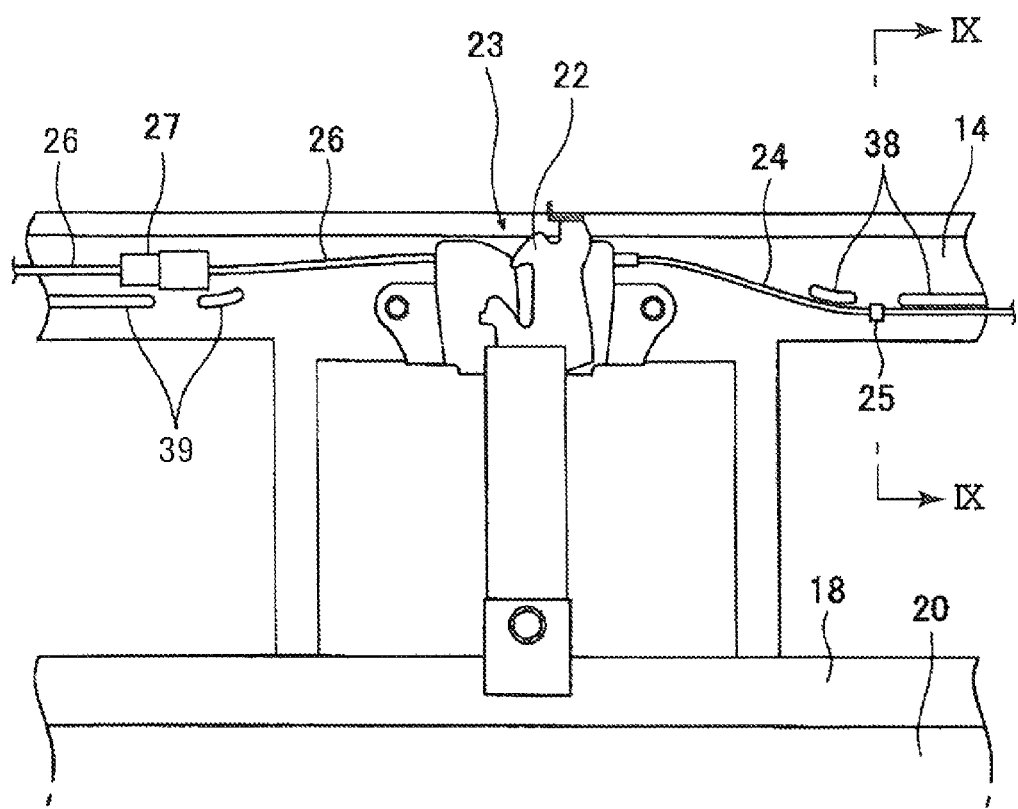
FIG. 4 is a fragmentary front view of the vehicle front body structure according to the first embodiment of the present invention, in a state in which a center stay is removed.
Figure 5:
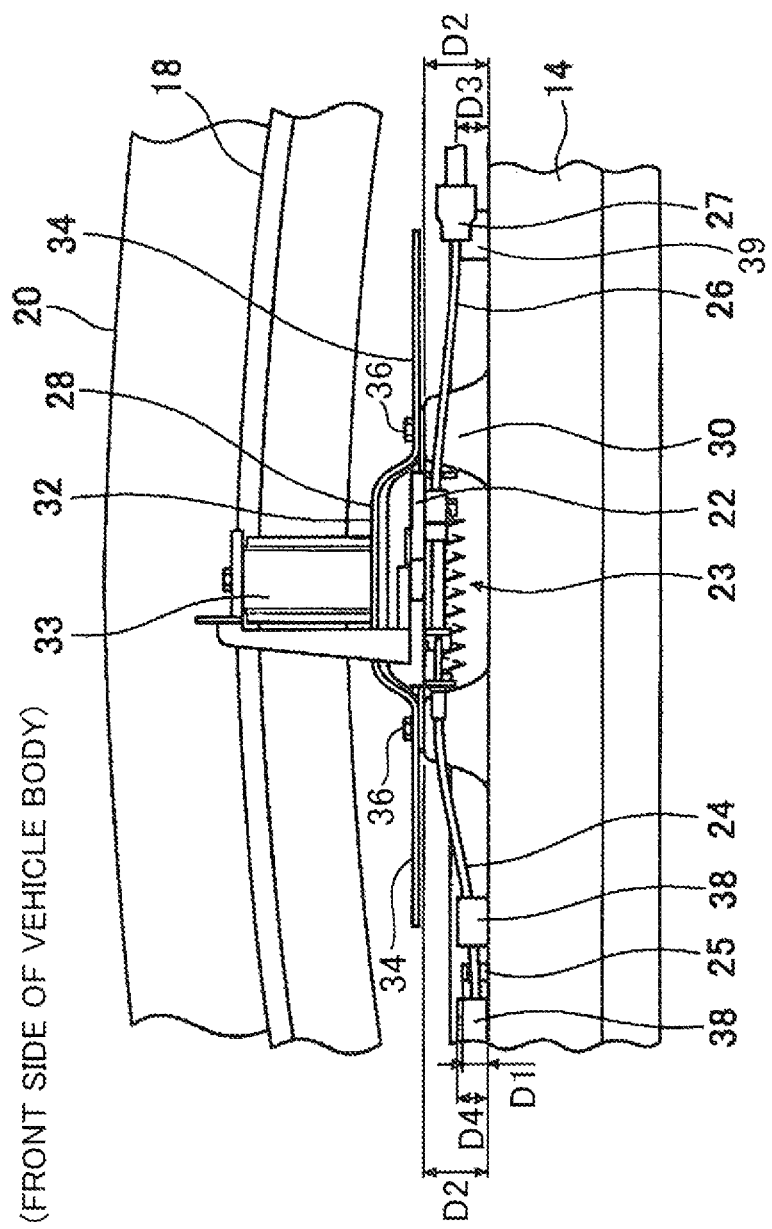
FIG. 5 is a fragmentary top plan view of the vehicle front body structure according to the first embodiment of the present invention, in a state in which the center stay is attached.
Figure 6:
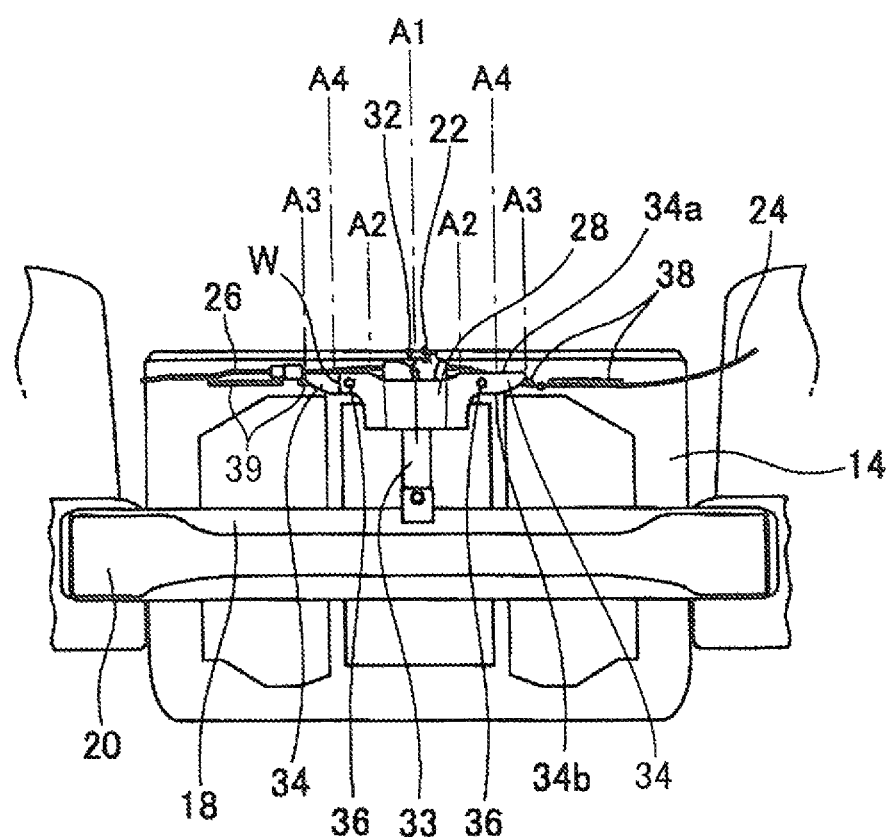
FIG. 6 is a fragmentary front view of the vehicle front body structure according to the first embodiment of the present invention, in a state in which the center stay is attached.
Figure 7:
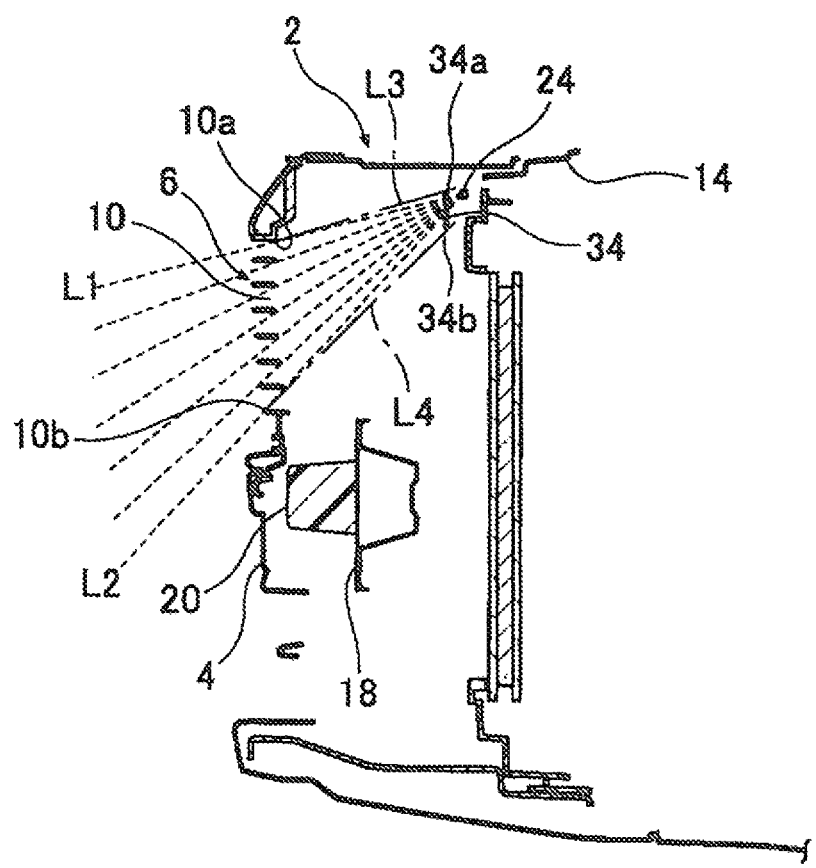
FIG. 7 is a sectional view viewed along the line VII-VII in FIG. 1.
Figure 8:
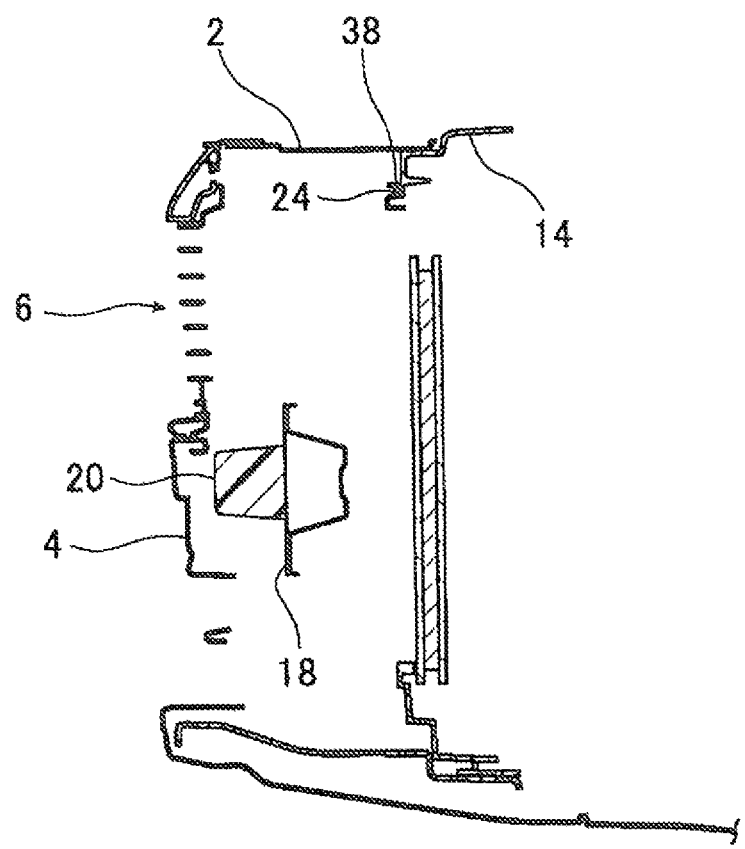
FIG. 8 is a sectional view viewed along the line VIII-VIII in FIG. 1.
Figure 9:
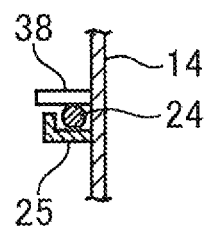
FIG. 9 is a sectional view viewed along the line IX-IX in FIG. 4.

A vehicle front body structure according to a first embodiment of the present invention will now be described based on FIGS. 1 TO 9. FIG. 1, FIG. 2 and FIG. 3 are, respectively: a front view illustrating a structure, primarily an exterior structure, of a front section of a vehicle body (vehicle front body), according to a first embodiment of the present invention; a schematic front view illustrating a structure, primarily an internal structure, of the vehicle front body, according to the first embodiment of the present invention; and a perspective view illustrating, in a simplified manner, the internal structure of the vehicle front body, according to the first embodiment of the present invention. FIG. 4, FIG. 5 and FIG. 6 are, respectively: a fragmentary front view of the vehicle front body structure according to the first embodiment of the present invention, in a state in which a center stay is removed; a fragmentary top plan view of the vehicle front body structure according to the first embodiment of the present invention, in a state in which the center stay is attached; and a fragmentary front view of the vehicle front body structure according to the first embodiment of the present invention, in a state in which the center stay is attached. FIG. 7, FIG. 8 and FIG. 9 are, respectively: a sectional view viewed along the line VII-VII in FIG. 1; a sectional view viewed along the line VIII-VIII in FIG. 1; and a sectional view viewed along the line IX-IX in FIG. 4. In the following description, the terms "front", "rear", "right" and "left" are defined on the basis of a vehicle body, unless otherwise noted.

As illustrated in FIG. 1, a vehicle 1 comprises: a hood 2 for covering a top of an engine compartment provided in a front section of a vehicle body; a bumper face 4 forming an outer surface of the front section of the vehicle body, at a position in front of and below the hood 2; and a grill 6 formed in front of the engine compartment and between the hood 2 and the bumper face 4. The hood 2 is equipped with a striker 8 (engagement element) provided on an inner surface of a front end of the hood 2 at an approximately vehicle-widthwise (vehicle-width-directionally) central position. The grill 6 has a large number of air inlet openings 10 formed in a mesh pattern to introduce air into the engine compartment.

Next, FIG. 2 illustrates a state in which the hood 2 is opened, and the bumper face 4 and the grill 6 are removed, and FIG. 3 illustrates the vehicle front body structure in a further simplified manner.

As illustrated in FIGS. 2 and 3, the vehicle front body is provided with a pair of front side frames 12 (see FIG. 3) extending in a front-rear direction at respective positions on opposite vehicle-widthwise outward sides (right and left sides of the vehicle body), and a radiator shroud 14 disposed vehicle-widthwise inward of the pair of front side frames 12 and behind the grill 6.

The radiator shroud 14 is a frame member made of a resin, and formed in a rectangular shape perpendicular to a front direction of the vehicle 1 to define a large opening 16 in a central region thereof, wherein an approximately upper half of the opening 16 is disposed behind the air inlet openings 10 of the grill 6 and at a height position approximately equal to that of the grill 6. Thus, air introduced from the air inlet openings 10 of the grill 6 will pass through the opening 16 and come into contact with a radiator and other components (not illustrated).

The pair of front side frames 12 have front ends provided with a bumper reinforcement 18 extending therebetween in a vehicle width direction at a position in front of the radiator shroud 14, and an impact absorbing member 20 attached to a front surface of the bumper reinforcement 18 to extend in the vehicle width direction. Each of the bumper reinforcement 18 and the impact absorbing member 20 is formed in an arc shape convexed in a frontward direction of the vehicle body, in top plan view.

Next, as illustrated in FIG. 4, a latch 22 is disposed on an approximately central region of a front surface of an upper portion of the radiator shroud 14. This latch 22 is provided to serve as an engagement counterpart element engageable with the striker 8 of the hood 2 during closing of the hood 2. The latch 22 is provided with a latch actuator mechanism 23 for actuating the latch 22 in an opening and closing manner.

Next, as illustrated in FIGS. 3 and 4, a hood release wire 24 arranged to extend from a left (when viewed from the front side of the vehicle body, right) lateral side of the radiator shroud 14 to the latch 22 along the front surface of the radiator shroud 14, and a protruding portion 25 (see also FIG. 9) supporting the hood release wire 24 from therebelow, are provided in front of the radiator shroud 14. The hood release wire 24 is arranged to extend from a hood opening/closing lever (not illustrated) to the latch actuator mechanism 23 inside the latch 22 after penetrating through a left sidewall of an upper portion of the latch 22, thereby mechanically connecting the opening and closing lever, the latch 22 and the latch actuator mechanism 23 together.

Further, a burglar alarm wire 26 composed of a plurality of sub-wires arranged to extend from a right (when viewed from the front side of the vehicle body, left) lateral side of the radiator shroud 14 to the latch 22 along the front surface of the radiator shroud 14, and a coupler 27 mutually connecting adjacent ones of the burglar alarm sub-wires 26, are provided in front of the radiator shroud 14. The plurality of burglar alarm sub-wires 26 are arranged to extend from a burglar siren 29 (see FIG. 3) to the latch actuator mechanism 23 inside the latch 22 after penetrating through a right sidewall of then upper portion of the latch 22, thereby electrically connecting the latch actuator mechanism 23 and the burglar siren 29 together. An electric circuit (not illustrated) using the burglar alarm wire 26 is configured to maintain current conduction therethrough when the hood is closed, and, interrupt the current conduction when the latch actuator mechanism 23 of the latch 22 is activated in an improper manner such as stealing. The burglar siren 29 is configured to generate a siren sound in response to interruption of current conduction through the burglar alarm wire 26, in order to prevent theft of a vehicle or the like.

Next, as illustrated in FIG. 5, the radiator shroud 14 is provided with a pair of radiator shroud-side mounting portions 30 each protruding frontwardly from the front surface of the radiator shroud 14 by a given distance, and right and left ends of the latch 22 are attached, respectively, to the radiator shroud-side mounting portions 30. In this manner, the latch 22 is disposed at a position frontwardly spaced apart from the front surface of the radiator shroud 14 by a given distance.

Thus, the hood release wire 24 is arranged to be pulled out in the frontward direction of the vehicle body, from a position of the protruding portion 25 protruding from the front surface of the radiator shroud 14 by a given distance D1, to a position of the latch actuator mechanism 23 of the latch 22 spaced apart from the front surface of the radiator shroud 14 by a given distance D2. The burglar alarm wire 26 is also arranged to be pulled out in the frontward direction of the vehicle body, from a position of the coupler 27 protruding from the front surface of the radiator shroud 14 by a given distance D3, to a position of the latch actuator mechanism 23 of the latch 22 spaced apart from the front surface of the radiator shroud 14 by the given distance D2. In a region adjacent to the latch 22, the hood release wire 24 or the burglar alarm wire 26 is arranged beyond a protruding distance (D4) of an aftermentioned shroud rib 38 in the front-rear direction.

Next, as illustrated in FIGS. 5 and 6, a center stay 28 (support) supporting the latch 22 with respect to the radiator shroud 14 is attached to the radiator shroud 14 at a position in front of the upper portion thereof to surround a region in front of the latch 22. The center stay 28 has a center stay cover portion 32 (see FIG. 5) located in front of the latch 22, and a bumper reinforcement connection portion 33 extending downwardly from a lower central region of the center stay cover portion 32 to mutually couple the center stay cover portion 32 and the bumper reinforcement 18 together. An upper end of the bumper reinforcement connection portion 33 is integrally fixed to the center stay cover portion 32 by spot-welding, and a lower end of the bumper reinforcement connection portion 33 is fixedly fastened to the bumper reinforcement 18 by a bolt.

The center stay cover portion 32 of the center stay 28 is disposed at a position capable of covering over, from the front side, the latch 22, and at least a part of the hood release wire 24 and the burglar alarm wire 26 each extending from the inside of the latch 22. Specifically, the center stay cover portion 32 of the center stay 28 has a frontwardly protruding convex region with a top surface positioned at a center position A1 of the center stay 28, and extends in opposite outward directions along the vehicle width direction, from the center position A1 of the center stay 28 to respective ones of right and left attaching positions A2, in a stepped manner. At each of the attaching positions A2, the center stay cover portion 32 is fixedly fastened to the radiator shroud 14 through the latch 22 by a bolt 36.

The center stay cover portion 32 of the center stay 28 has a pair of center stay protruding portions 34 (protruding portions) symmetrically extending in opposite outward directions along the vehicle width direction (opposite directions along a right-left direction of the vehicle body), and the center stay protruding portions 34 are disposed at positions capable of hindering at least a part of the hood release wire 24 and the burglar alarm wire 26 from being visually seen from the front side. Specifically, each of the center stay protruding portions 34 is formed to extend over a range from a respective one of the right and left attaching positions A2 of the center stay cover portion 32 to a given position A3 farther spaced apart in the vehicle-widthwise outward direction, in approximately parallel relation to the front surface of the radiator shroud 14. In this embodiment, for example, the given position A3 is set at a position spaced apart from a vehicle-widthwise center of the radiator shroud 14 in the right-left direction by a size of about ¼ of the overall width of the radiator shroud 14, or a position corresponding to a position where the hood release wire 24 is arranged beyond a height of the aftermentioned shroud rib 38, or a position corresponding to a vehicle-widthwise inward end of the aftermentioned shroud rib 38. In place of the configuration in which the center stay protruding portion 34 is formed in a plate shape approximately parallel to the front surface of the radiator shroud 14, the center stay protruding portion 34 may be formed in such a manner as to be inclined with respect to the front surface of the radiator shroud 14, or may be formed in a curved shape.

An upper end 34a of the center stay protruding portion 34 extends approximately horizontally from the given position A2 to the given position A3, and a lower end 34b of the center stay protruding portion 34 extends gradually downwardly in a direction from the given position A3 at a distal end of the center stay protruding portion, toward a given position A4 located between the given position A2 and the given position A3, and then extends approximately horizontally in a range from the given position A4 to the given position A2.

In this manner, the center stay protruding portion 34 is formed such that a width W thereof in an up-down direction is gradually increased in the range from the given position A3 at the distal end of the center stay protruding portion, to the given position A4, and then maintained constant in the range from the given position A4 to the given position A2.

Next, as illustrated in FIG. 7, in the vehicle 1, the grill 6, one of the center stay protruding portions 34 and the hood release wire 24 are arranged in this order from the front side thereof.

In this arrangement, the center stay protruding portion 34 is positioned in a region capable of blocking virtual straight lines extending from the respective air inlet openings formed in the grill 6.

Specifically, the upper end 34a of the center stay protruding portion 34 is disposed at a height position equal to or higher than the broken line L1 connecting an uppermost inner edge 10a of the group of air inlet openings 10 of the grill 6 and the hood release wire 24, and the lower end 34b of the center stay protruding portion 34 is disposed at a height position equal to or lower than the broken line L2 connecting a lowermost outer edge 10b of the group of air inlet openings 10 of the grill 6 and the hood release wire 24. Thus, the center stay protruding portion 34 is formed to include a surface going across a range from a position on the broken line L1 to a position on the broken line L2.

In other words, the hood release wire 24 is arranged in a position between the one-dot chain line L3 connecting the uppermost inner edge 10a of the group of air inlet openings 10 of the grill 6 and the upper end 34a of the center stay protruding portion 34, and the one-dot chain line L4 connecting the lowermost outer edge 10b of the group of air inlet openings 10 of the grill 6 and the lower end 34b of the center stay protruding portion 34. A positional relationship between the other center stay protruding portion 34 and the burglar alarm wire 26 may be set in the same manner as the aforementioned positional relationship between the one center stay protruding portion 34 and the hood release wire 24.

Further, as illustrated in FIGS. 4, 6 and 8, the front surface of the radiator shroud 14 is provided with a first shroud rib 38 (first guide portion) and a second shroud rib 39 (second guide portion) each extending from a respective one of the left and right given positions A3 in the vehicle-widthwise outward direction. Specifically, in this embodiment, the first shroud rib 38 is provided at a position spaced apart from the center of the front surface of the radiator shroud 14 in a leftward direction of the vehicle body, and the second shroud rib 39 is provided at a position spaced apart from the center of the front surface of the radiator shroud 14 in a rightward direction of the vehicle body. The positional relationship between the shroud ribs 38, 39 is set to be bilaterally symmetric with respect to the center of the front surface of the radiator shroud 14 (installation position of the latch 22).

Each of the first and second shroud ribs 38, 39 is formed to protrude from the front surface of the radiator shroud 14 in the frontward direction of the vehicle body by a given distance D4 illustrated in FIG. 5. In this case, the protruding distance (height) D4 of each of the shroud ribs 38, 39 cannot be set to a sufficiently large value, due to a forming process thereof, because the radiator shroud 14 is formed using a resin or the like. Therefore, the spacing distance D2 of the latch 22 with respect to the front surface of the radiator shroud 14 is set to a greater value than the protruding distance D4 of each of the shroud ribs 38, 39 (D2>D4).

The burglar alarm wire 26 is arranged to extend from the latch 22 in a rightward direction of the vehicle body and pass through a position above the second shroud rib 39.

On the other hand, the hood release wire 24 is arranged to extend from the latch 22 in the leftward direction of the vehicle body and pass through a position below the first shroud rib 38. In this case, a coupling position between the hood release wire 24 and the latch 22 is set above the first shroud rib 38. Therefore, the hood release wire 24 is gradually bent downwardly in a direction from the latch 22 toward the first shroud rib 38, and arranged to, in the position below the first shroud rib 38, extend directly along a lower surface of the first shroud rib 38 (i.e., in a contact state with the lower surface). Further, the protruding portion 25 is formed at a position slightly below the first shroud rib 38, so that the hood release wire 24 is arranged while being sandwiched between the protruding portion 25 and the first shroud rib 38 in the up-down direction (see FIG. 9).

Next, a function of the vehicle front body structure according to the first embodiment of the present invention will be described. As illustrated in FIG. 1, in a state in which the hood 2 is closed, the latch 22 is held in a closed position. When a user (vehicle occupant) manipulates a hood opening/closing lever (not illustrated), the hood release wire 24 is pulled. Thus, the latch actuator mechanism 23 connected to the hood release wire 24 is pulled by the hood release wire 24, so that the latch 22 is moved to an open position. In this manner, the user can open the hood 2.

In the state in which the hood 2 is closed, and the latch 22 is held in the closed position, a current is conducted through the burglar alarm wire 26. In this state, even if the user manipulates the hood opening/closing lever to open the hood 2, the current conduction through the burglar alarm wire 26 is maintained, so that the burglar siren 29 is not activated.

On the other hand, it is assumed that a person who intends to steal a vehicle or the like attempts to insert a hooking member such as a hook-equipped bar, from one of the air inlet openings 10 of the grill 6 provided in a front end of the vehicle body, so as to hook the hood release wire 24 and open the latch 22. When the hood 2 is opened through such an improper manipulation, the current conduction through the burglar alarm wire 26 is interrupted, so that the burglar siren 29 generates a sound. Further, for example, when one of the burglar alarm wire 26 is physically cut off in an improper manner, the current conduction through the burglar alarm wire 26 is also interrupted, so that the burglar siren 29 generates a sound.

However, in the aforementioned vehicle front body structure according to the first embodiment of the present invention, it becomes possible to first reduce a possibility that the above improper manipulation is carried out, thereby effectively suppress a risk of theft or the like.

That is, in the first embodiment, by the center stay protruding portions 34 of the center stay cover portion 32 of the center stay 28, at least a part of the hood release wire 24 and the burglar alarm wire 26 is covered over in such a manner as to be kept from being visually seen from the front side of the vehicle body through the air inlet openings 10. Thus, even if it is attempted to perform a manipulation, for example, of pulling the hood release wire 24 coupled to the latch 22, in the frontward direction of the vehicle body by using a hooking member capable of being inserted through one of the air inlet openings 10, the manipulation is hindered by the center stay protruding portions 34, so that it becomes possible to suppress the risk that the latch 22 is improperly manipulated and shifted to the open state so as open the hood 2. It is also assumed that a manipulation, for example, of short-circuiting the burglar alarm wire 26 to maintain the current conduction is performed through the air inlet opening 10 as a countermeasure for preventing the burglar siren 29 from generating a sound. However, the above configuration provided with the center stay protruding portions 34 can also suppress a risk of such a manipulation.

In the first embodiment, the hood release wire 24 is arranged to extend from the latch 22 in the leftward direction of the vehicle body and pass through the position below the first shroud rib 38, and the burglar alarm wire 26 is arranged to extend from the latch 22 in the rightward direction of the vehicle body and pass through the position above the second shroud rib 39. Further, the coupling position between the hood release wire 24 and the latch 22 is set above the first shroud rib 38. This configuration makes it possible to hinder, by the shroud ribs 38, 39, a manipulation for the hood release wire 24 and the burglar alarm wire 26 from the front side of the vehicle body, thereby suppressing the risk that the latch 22 is improperly manipulated and shifted to the open state.

That is, in the first embodiment, the hood release wire 24 is arranged to extend from a coupling portion between the latch 22 and the hood release wire 24 and pass through a position below the first shroud rib 38 located below the coupling portion, so that the hood release wire 24 is arranged in adjacent or contact relation to the lower surface of the first shroud rib 38, and a gap to be defined therebetween is suppressed to an extremely small value. Thus, even if it is attempted to pull the hood release wire 24 by a hooking member such as a hook-equipped bar, it becomes difficult to insert a distal end of the hooking member into a gap between the hood release wire 24 and the lower surface of the first shroud rib 38, thereby hindering the manipulation of pulling the hood release wire 24. On the other hand, regarding the burglar alarm wire 26, the manipulation for maintaining the current conduction therethrough (e.g., a manipulation of short-circuiting the burglar alarm wire 26) is directly hindered by the second shroud rib 39 located below the burglar alarm wire 26. Then, as a result of these functions, it becomes possible to reduce a possibility that the latch 22 is improperly manipulated and shifted to the open state, thereby more effectively suppress the risk of theft or the like.

In the first embodiment, the protruding portion 25 is provided at a given position of the radiator shroud 14 located below the first shroud rib 38, to sandwich the hood release wire 24 in cooperation with the first shroud rib 38. This configuration allows the hood release wire 24 to come into close contact with the lower surface of the first shroud rib 38 to more reliably reduce the gap therebetween, so that it becomes possible to more effectively hinder the manipulation of hooking the hood release wire 24.

In the first embodiment, the spacing distance D2 of the latch 22 from the front surface of the radiator shroud 14 is set to a value greater than the protruding distance D4 of each of the shroud ribs 38, 39 from the front surface of the radiator shroud 14. Thus, each of the hood release wire 24 and the burglar alarm wire 26 is gradually frontwardly bent in a direction toward the vehicle-widthwise center, and, in a region adjacent to the latch 22 (around the vehicle-widthwise center of the radiator shroud 14), arranged at a position beyond the protruding distance D4 of each of the shroud ribs 38, 39 (see FIG. 5). However, the center stay protruding portions 34 of the center stay cover portion 32 are provided in the region adjacent to the latch 22 in such a manner that the center stay protruding portions 34 cover over the hood release wire 24 and the burglar alarm wire 26 from the front side, as mentioned above.

As above, in the first embodiment, a portion of each of the hood release wire 24 and the burglar alarm wire 26 located adjacent to the latch 22 is covered from the front side of the vehicle body by the center stay protruding portions 34. On the other hand, regarding a portion of each of the hood release wire 24 and the burglar alarm wire 26 located apart from the latch 22 in the vehicle-widthwise outward direction, an upper side or a lower side thereof is covered by a respective one of the shroud ribs 38, 39. Thus, it becomes possible to more reliably suppress the risk that the manipulation of pulling the hood release wire 24 from the front side of the vehicle body or the manipulation of maintaining the current conduction through the burglar alarm wire 26 is performed from the front side of the vehicle body.

In the first embodiment of the present invention, the center stay protruding portions 34 are formed to protrude from the central region of the center stay cover portion 32 in the leftward and rightward directions of the vehicle body (the one direction and the other direction along the vehicle width direction), respectively, and arranged to cover over respective portions of the hood release wire 24 and the burglar alarm wire 26 located adjacent to the latch 22, from the front side of the vehicle body. Thus, for example, even if an arrangement of the hood release wire 24 and the burglar alarm wire 26 in the right-left direction varies depending on types of vehicles, as in a vehicle model including a right-hand drive vehicle and a left-hand drive vehicle, center stays 28 having the same shape can be used in common.

Figure 10:
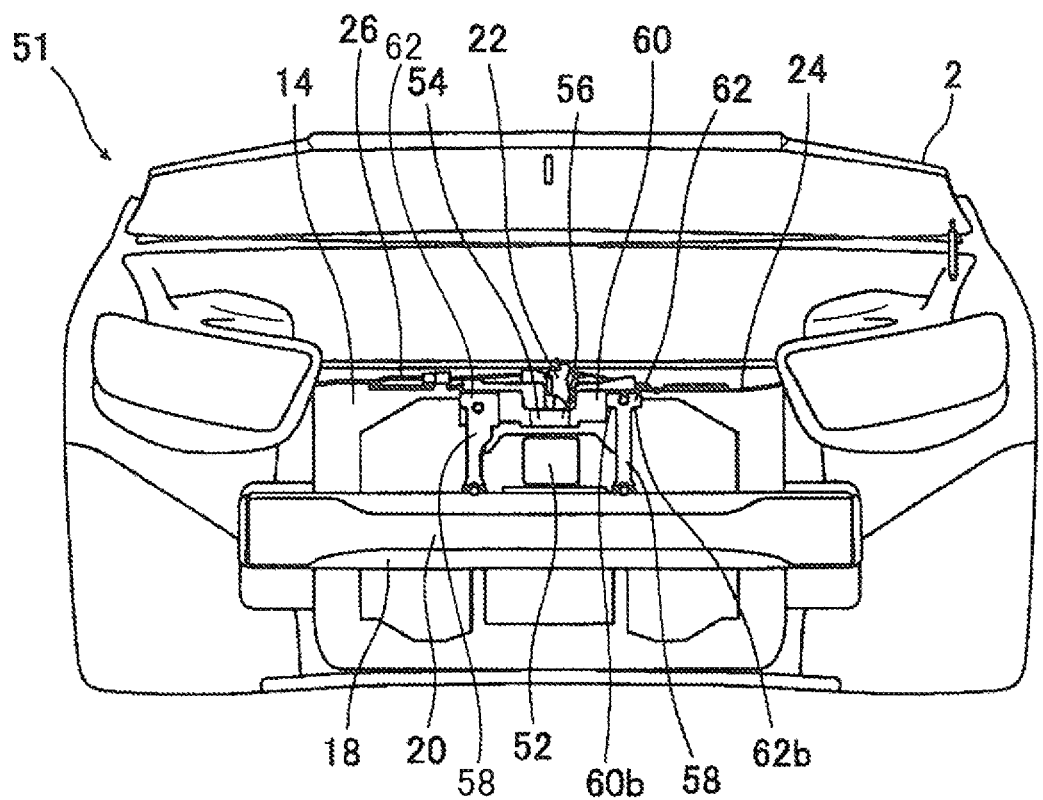
FIG. 10 is a schematic front view illustrating a structure, primarily an internal structure, of a vehicle front body, according to a second embodiment of the present invention.

Next, a vehicle front body structure according to a second embodiment of the present invention will be described based on FIG. 10. FIG. 10 is a schematic front view illustrating a structure, primarily an internal structure, of a front section of a vehicle body (vehicle front body), according to a second embodiment of the present invention. The vehicle front body structure according to the second embodiment has the same fundamental structure as the vehicle front body structure according to the first embodiment. Thus, only a feature of the second embodiment difference from the first embodiment will be described here.

As illustrated in FIG. 10, a vehicle 51 in the second embodiment additionally has a pre-crash safety function capable of detecting a collision in advance. For this purpose, the vehicle 51 is equipped with detection means 52 for detecting a collision in advance.

Specifically, the detection means 52 is disposed in a region in front of a vehicle-widthwise central portion of a radiator shroud 14 and at a position above a bumper reinforcement 18 and below a center stay 54 (support).

The center stay 54 has a center stay cover portion 56 disposed in front of a latch 22, and a pair of right and left bumper reinforcement connection portions 58 each mutually coupling the center stay cover portion 56 and a bumper reinforcement 18 together. Each of the bumper reinforcement connection portions 58 has a lower end connected to the bumper reinforcement 18, and an upper end connected to the center stay cover portion 56, and they are arranged to extend between the bumper reinforcement 18 and the center stay cover portion 56 in a vertical direction and in parallel relation to each other.

The center stay cover portion 56 of the center stay 54 is disposed at a position capable of covering over, from the front side, the latch 22, and at least a part of a hood release wire 24 and a burglar alarm wire 26 each extending from an inside of the latch 22 in a right-left direction. Specifically, the center stay cover portion 56 has a pair of center stay protruding portions 60 (protruding portions) each having, for example, a quadrangular shape and symmetrically extending in opposite outward directions along a vehicle width direction (opposite directions along the right-left direction of the vehicle body), and the center stay protruding portions 60 are disposed at positions capable of covering over at least a part of the hood release wire 24 and the burglar alarm wire 26 from the front side.

The bumper reinforcement connection portions 58 have upper ends each connected to a respective one of the center stay protruding portions 60 of the center stay cover portion 56. For this purpose, each of the center stay protruding portions 60 is formed with a coupling portion 62 for connecting a respective one of the bumper reinforcement connection portions 58 to the center stay protruding portion 60. That is, the coupling portions 62 of the center stay protruding portions 60 are also disposed at positions capable of covering over at least a part of the hood release wire 24 and the burglar alarm wire 26 from the front side.

Next, a positional relationship between each of the center stay protruding portions and the hood release wire as viewed from the side of a grill will be described.

The center stay protruding portions 60 are positioned in a region capable of blocking straight lines extending from respective air inlet openings (not illustrated) formed in the grill, to the hood release wire 24.

For this purpose, a lower end 60b of each of the center stay protruding portions 60, and a lower end 62b of the coupling portion 62 provided in the center stay protruding portion 60, are arranged at a height position equal to or below the broken line L2 connecting the lowermost outer edge 10b of the group of air inlet openings 10 and the hood release wire 24 as described in the first embodiment in connection with FIG. 7. Further, in the case where the bumper reinforcement connection portions 58 are provided in front of the respective center stay protruding portions 60, a part of the hood release wire 24 and the burglar alarm wire 26 is also covered over from the front side by the bumper reinforcement connection portions 58.

As above, in the vehicle front body structure according to the second embodiment of the present invention, the center stay 54 and the bumper reinforcement 18 located below the center stay 54 are coupled to each other through the bumper reinforcement connection portions 58, and the coupling portions 62 for connecting the respective bumper reinforcement connection portions 58 to the center stay protruding portion 60 are provided, respectively, in the center stay protruding portions 60 of the center stay cover portion 56 of the center stay 54. The coupling portions 62 are disposed at positions capable of covering over at least a part of the hood release wire 24 and the burglar alarm wire 26 from the front side. Thus, it becomes possible to hinder a manipulation, for example, of pulling the hood release wire 24 coupled to the latch, from the front side of the vehicle body, thereby suppressing a risk that the latch 22 is improperly manipulated and shifted to an open state and open a hood 2. Further, it becomes possible to suppress a risk that a manipulation of maintaining current conduction through the burglar alarm wire 26 is performed from the front side of the vehicle body.

Lastly, features of the present invention and advantageous effects thereof will be outlined based on the disclosure of the above embodiment.

A vehicle front body structure of the present invention comprises: a hood (2) for covering a top of an engine compartment provided in a front section of a vehicle (1); an engagement element (8) provided on a front section of the hood (2); a radiator shroud (14) provided in a front section of the engine compartment; an engagement counterpart element (22) provided in front of the radiator shroud (14) and engageable with the engagement element (8); a wire (24, 26) arranged to extend from a lateral side of the radiator shroud (14) and pass through a position in front of the radiator shroud (14), and coupled to the engagement counterpart element (22); and a support (28) supporting the engagement counterpart element (22) with respect to the radiator shroud (14). The support (28) has a protruding portion (34) which protrudes toward a position capable of hindering at least a part of the wire (24, 26) from being visually seen from a front side of the vehicle body.

In the present invention, at least a part of the wire is covered over by the protruding portion of the support, in such a manner as to be kept from being visually seen from the front side of the vehicle body, so that it becomes possible to hinder the wire coupled to the engagement counterpart element from being manipulated from the front side of the vehicle body and suppress a risk that the hood is improperly manipulated and opened.

Preferably, the vehicle front body structure of the present invention further comprises: a bumper face (4) forming an outer surface of a front section of a vehicle body, at a position under a front end of the hood (2); and a grill (6) formed in front of the engine compartment and between the hood (2) and the bumper face (4). The grill (6) has an air inlet opening (10) for introducing air into the engine compartment, and the protruding portion (34) of the support (28) protrudes toward a position capable of hindering at least a part of the wire (24, 26) from being visually seen from the front side of the vehicle body through the air inlet opening (10).

When the protruding portion is provided at a position capable of hindering at least a part of the wire from being visually seen through the air inlet opening, it becomes possible to suppress a risk that the wire is manipulated, for example, by using a hooking member capable of being inserted through the air inlet opening.

Preferably, in the above configuration, the wire comprises a hood release wire (24) configured to be pulled during opening of the hood (2), thereby releasing an engagement between the engagement element (8) and the engagement counterpart element (22), and a burglar alarm wire (26) configured to be changed in current conduction state during improper opening of the hood (2). The radiator shroud (14) has a first guide portion (38) protruding in a frontward direction of the vehicle body, at a position spaced apart from the engagement counterpart element (22) in one of opposite directions along a vehicle width direction, and a second guide portion (39) protruding in the frontward direction of the vehicle body, at a position spaced apart from the engagement counterpart element (22) in the other direction along the vehicle width direction. The hood release wire (24) is arranged to extend from the engagement counterpart element (22) in the one direction along the vehicle width direction and pass through a position below the first guide portion (38), the burglar alarm wire (26) is arranged to extend from the engagement counterpart element (22) in the other direction along the vehicle width direction and pass through a position above the second guide portion (39). A coupling position between the hood release wire (24) and the engagement counterpart element (22) is set above the first guide portion (38).

In this configuration, the hood release wire is arranged just below the first guide portion, at the position spaced apart from the engagement counterpart element in the one direction along a vehicle width direction, so that, even if it is attempted to hook a hooking member or the like, to the hood release wire, the manipulation is hindered by the first guide portion. Further, the burglar alarm wire is arranged above the second guide portion, at the position spaced apart from the engagement counterpart element in the other direction along a vehicle width direction, so that, even if it is attempted to perform a manipulation for preventing a change in current conduction state, with respect to the burglar alarm wire, the manipulation is hindered by the second guide portion.

More preferably, in the above configuration, the radiator shroud (14) has a protruding portion (25) provided at a given position located below the first guide portion (38), to sandwich the hood release wire (24) in cooperation with the first guide portion (38).

This configuration allows the hood release wire to come into close contact with a lower surface of the first guide portion to more reliably reduce a gap therebetween, so that it becomes possible to reliably suppress the risk that an improper manipulation is performed with respect to the hood release wire.

Preferably, in the present invention, the support (28) has a pair of protruding portions (34) which protrude, respectively, in one of opposite directions along a vehicle width direction, and the other direction along the vehicle width direction.

This configuration makes it possible to cover over the wire on right and left sides of the engagement counterpart element, and, even if an arrangement of the wire in the right-left direction varies depending on types of vehicles, as in a vehicle model including a right-hand drive vehicle and a left-hand drive vehicle, supports having the same shape can be used in common.

Preferably, the vehicle front body structure of the present invention further comprises: a bumper reinforcement (18) extending in a vehicle width direction, at a position in front of the radiator shroud (14), and a bumper reinforcement connection portion (58) coupling the support (54) and the bumper reinforcement (18) together. The support (54) is disposed above the bumper reinforcement (18), and the protruding portion (60) of the support (54) is provided with a coupling portion (62) for connecting the bumper reinforcement connection portion (58) to the support (54).

In this configuration, at least a part of the wire is also covered over from the front side of the vehicle body by the coupling portion, so that it becomes possible to more reliably suppress the risk that the wire coupled to the engagement counterpart element is improperly manipulated from the front side of the vehicle body.

What is claimed is:

1. A vehicle front body structure comprising:
   a hood for covering a top of an engine compartment provided in a front section of a vehicle;
   a bumper face forming an outer surface of a front section of a vehicle body, at a position under a front end of the hood;
   a grill formed in front of the engine compartment and between the hood and the bumper face;
   an engagement element provided on a front section of the hood;
   a radiator shroud provided in a front section of the engine compartment;
   an engagement counterpart element provided in front of the radiator shroud and engageable with the engagement element;
   a wire arranged to extend from a lateral side of the radiator shroud and pass through a position in front of the radiator shroud, and coupled to the engagement counterpart element; and
   a support supporting the engagement counterpart element with respect to the radiator shroud,
   wherein:
   the grill has a plurality of air inlet openings for introducing air into the engine compartment;
   the support has a protruding portion which protrudes toward a position capable of hindering at least a part of the wire from being visually seen from a front side of the vehicle body through the air inlet openings;
   the wire comprises a hood release wire configured to be pulled during opening of the hood, thereby releasing an engagement between the engagement element and the engagement counterpart element, and a burglar alarm wire through which current conduction state is changed during improper opening of the hood; and
   the radiator shroud has a first guide portion protruding in a frontward direction of the vehicle body, at a position spaced apart from the engagement counterpart element in one of opposite directions along a vehicle width direction, and a second guide portion protruding in the frontward direction of the vehicle body, at a position spaced apart from the engagement counterpart element in the other direction along the vehicle width direction, and wherein:

the hood release wire is arranged on a front surface of an upper portion of the radiator shroud to extend from the engagement counterpart element in the one direction along the vehicle width direction and pass through a position below the first guide portion;

the burglar alarm wire is arranged on the front surface of the upper portion of the radiator shroud to extend from the engagement counterpart element in the other direction along the vehicle width direction and pass through a position above the second guide portion;

a coupling position between the hood release wire and the engagement counterpart element is set above the first guide portion; and the protruding portion is disposed to cover at least a range from a position on a line connecting an uppermost inner edge of the plurality of air inlet openings and the hood release wire to a position on a line connecting a lowermost outer edge of the plurality of air inlet openings and the hood release wire.

2. The vehicle front body structure as defined in claim 1, wherein the radiator shroud has a protruding portion provided at a given position located below the first guide portion, to sandwich the hood release wire in cooperation with the first guide portion.

3. The vehicle front body structure as defined in claim 1, wherein the support has a pair of protruding portions which protrude, respectively, in the one direction along the vehicle width direction, and the other direction along the vehicle width direction.

4. The vehicle front body structure as defined in claim 1, further comprising: a bumper reinforcement extending in the vehicle width direction, at a position in front of the radiator shroud, and a bumper reinforcement connection portion coupling the support and the bumper reinforcement together, and wherein:

the support is disposed above the bumper reinforcement; and the protruding portion of the support is provided with a coupling portion for connecting the bumper reinforcement connection portion to the support.

5. The vehicle front body structure as defined in claim 2, further comprising: a bumper reinforcement extending in the vehicle width direction, at a position in front of the radiator shroud, and a bumper reinforcement connection portion coupling the support and the bumper reinforcement together, and wherein:

the support is disposed above the bumper reinforcement; and the protruding portion of the support is provided with a coupling portion for connecting the bumper reinforcement connection portion to the support.

6. The vehicle front body structure as defined in claim 3, further comprising: a bumper reinforcement extending in the vehicle width direction, at a position in front of the radiator shroud, and a bumper reinforcement connection portion coupling the support and the bumper reinforcement together, and wherein:

the support is disposed above the bumper reinforcement; and the protruding portion of the support is provided with a coupling portion for connecting the bumper reinforcement connection portion to the support.

* * * * *